(12) United States Patent
James

(10) Patent No.: US 10,344,679 B2
(45) Date of Patent: Jul. 9, 2019

(54) SHIELD FOR ARRANGING BETWEEN A BEARING AND A ROTATING SEAL ELEMENT

(71) Applicant: United Technologies Corporation, Hartford, CT (US)

(72) Inventor: Denman H. James, Windsor, CT (US)

(73) Assignee: United Technologies Corporation, Farmington, CT (US)

( * ) Notice: Subject to any disclaimer, the term of this patent is extended or adjusted under 35 U.S.C. 154(b) by 508 days.

(21) Appl. No.: 14/775,808

(22) PCT Filed: Mar. 14, 2014

(86) PCT No.: PCT/US2014/027184
§ 371 (c)(1),
(2) Date: Sep. 14, 2015

(87) PCT Pub. No.: WO2014/152300
PCT Pub. Date: Sep. 25, 2014

(65) Prior Publication Data
US 2016/0032840 A1    Feb. 4, 2016

Related U.S. Application Data

(60) Provisional application No. 61/787,334, filed on Mar. 15, 2013.

(51) Int. Cl.
*F02C 7/06*        (2006.01)
*F02C 7/28*        (2006.01)
(Continued)

(52) U.S. Cl.
CPC .............. *F02C 7/28* (2013.01); *F01D 11/003* (2013.01); *F01D 25/16* (2013.01); *F01D 25/183* (2013.01);
(Continued)

(58) Field of Classification Search
CPC ...... F04D 29/04; F04D 29/046; F04D 29/049; F04D 29/05; F04D 29/056; F04D 29/059;
(Continued)

(56) References Cited

U.S. PATENT DOCUMENTS 2,234,574 A * 3/1941 Olcott .................... F16C 19/18
277/347
2,875,001 A * 2/1959 Miller .................... F01D 25/16
384/126
(Continued)

FOREIGN PATENT DOCUMENTS

JP          H0518375 B2    1/1993

OTHER PUBLICATIONS

EP search report for EP14770411.8 dated Dec. 9, 2016.

*Primary Examiner* — Richard A Edgar
(74) *Attorney, Agent, or Firm* — O'Shea Getz P.C.

(57) ABSTRACT

An assembly is provided that includes a shaft, a bearing, a stator seal element, a rotor seal element and a shield. The shaft extends along an axis. The bearing supports the shaft and receives lubrication fluid. The stator seal element circumscribes the shaft. The rotor seal element is mounted on the shaft axially between the bearing and the stator seal element. The rotor seal element forms a seal with the stator seal element. The shield substantially prevents the lubrication fluid from traveling axially away from the bearing onto the rotor seal element.

20 Claims, 7 Drawing Sheets

(51) Int. Cl.
*F01D 11/00* (2006.01)
*F01D 25/16* (2006.01)
*F01D 25/18* (2006.01)
*F04D 29/12* (2006.01)
*F16C 19/52* (2006.01)
*F16C 33/78* (2006.01)
*F16J 15/16* (2006.01)
*F16J 15/34* (2006.01)
*F04D 29/063* (2006.01)

(52) U.S. Cl.
CPC .............. *F02C 7/06* (2013.01); *F04D 29/063* (2013.01); *F04D 29/124* (2013.01); *F16C 19/525* (2013.01); *F16C 33/78* (2013.01); *F16J 15/16* (2013.01); *F16J 15/342* (2013.01); *F16J 15/3452* (2013.01); F05D 2240/55 (2013.01); F05D 2240/70 (2013.01); F05D 2260/231 (2013.01); F05D 2260/941 (2013.01)

(58) Field of Classification Search
CPC ........ F04D 29/06; F04D 29/063; F04D 29/08; F04D 29/083; F04D 29/10; F04D 29/102; F04D 29/104; F04D 29/12; F04D 29/122; F04D 29/124; F01D 25/18; F01D 25/183; F01D 25/186; F01D 25/16; F01D 25/166
See application file for complete search history.

(56) References Cited

U.S. PATENT DOCUMENTS

| | | | | |
|---|---|---|---|---|
| 2,882,105 | A * | 4/1959 | Broadbent | F01D 25/18 384/473 |
| 2,938,661 | A * | 5/1960 | Ricketts | F04D 29/102 415/111 |
| 4,406,459 | A | 9/1983 | Davis et al. | |
| 4,406,460 | A | 9/1983 | Slayton | |
| 4,623,297 | A * | 11/1986 | Beam, Jr. | F01D 5/026 415/118 |
| 4,917,218 | A * | 4/1990 | Murray | F01D 25/18 184/107 |
| 4,928,978 | A * | 5/1990 | Shaffer | F01D 25/183 277/401 |
| 5,636,848 | A | 6/1997 | Hager et al. | |
| 5,727,095 | A | 3/1998 | Hoeting | |
| 6,287,100 | B1 | 9/2001 | Achtelik et al. | |

* cited by examiner

SHIELD FOR ARRANGING BETWEEN A BEARING AND A ROTATING SEAL ELEMENT

CROSS-REFERENCE TO RELATED APPLICATIONS

This application claims priority to PCT Patent Appln. No. PCT/US14/27184 filed Mar. 14, 2014, which claims priority to U.S. Patent Appln. No. 61/787,334 filed Mar. 15, 2013, which are hereby incorporated herein by reference in their entireties.

BACKGROUND OF THE INVENTION

1. Technical Field

This disclosure relates generally to rotational equipment and, more particularly, to an assembly including a bearing and a rotating seal element.

2. Background Information

A seal assembly is typically used in rotational equipment to provide a seal between regions of high and low fluid pressure and/or temperature. A seal assembly may be used, for example, to provide a gas and/or liquid seal between a stator and a rotor of a turbine engine, a pump, a compressor, a turbine of a hydro-electric or wind generator, as well as various other types of rotational equipment.

A seal assembly for a turbine engine may include a lift-off face seal that is connected to a seal support. The seal support is connected to a stator with a plurality of fasteners. The seal support includes a plurality of coil springs that bias the face seal axially against a forward side of a seal landing. The seal landing is mounted on a shaft. The seal landing has an aft side that axially contacts an inner race of a bearing, which supports the shaft.

During turbine engine operation, a side of the face seal and the forward side of the seal landing may be exposed to relatively hot air. A portion of this air may be directed into passages within the face seal to provide a film of air between the face seal and the seal landing. Heat energy may be transferred from the air into the seal landing, which may significantly increase the temperature of the seal landing. A portion of relatively cool lubrication oil may travel axially from the bearing onto the aft side of the seal landing. This lubrication oil may transfer the heat energy out of and thereby cool the seal landing. However, since air and lubrication oil typically have different heat transfer coefficients, the aft side of the seal landing may become significantly cooler than the forward side. The seal landing therefore may be subject to a relatively non-uniform temperature gradient, which may cause the seal landing to cone away from the face seal. Such coning may increase leakage between the face seal and the seal landing.

There is a need in the art for an improved seal assembly.

SUMMARY OF THE DISCLOSURE

According to an aspect of the invention, a turbine engine assembly is provided that includes a turbine engine shaft, a bearing, a rotor seal element and a shield. The shaft extends along an axis. The bearing includes an inner race and an outer race, where the inner race is mounted on the shaft and is separated from the outer race by a gap. The rotor seal element is mounted on the shaft. The shield substantially blocks an axial line of sight between the gap and the rotor seal element.

According to another aspect of the invention, another turbine engine assembly is provided that includes a housing which defines an annular chamber, a turbine engine shaft, a bearing, a rotor seal element and a shield. The shaft extends along an axis into the chamber. The bearing supports the shaft within the chamber. The bearing includes an inner race and an outer race that is separated from the inner race by a gap. The rotor seal element is mounted on the shaft within the chamber. The rotor seal element includes a seal surface that faces away from the bearing. The shield includes a sleeve and a flange. The sleeve is mounted on the shaft axially between the bearing and the rotor seal element. The flange extends radially from the sleeve and substantially blocks a line of sight into the gap.

According to still another aspect of the invention, an assembly is provided that includes a shaft, a bearing, a stator seal element, a rotor seal element and a shield. The shaft extends along an axis. The bearing supports the shaft, and receives lubrication fluid. The stator seal element circumscribes the shaft. The rotor seal element is mounted on the shaft axially between the bearing and the stator seal element. The rotor seal element forms a seal with the stator seal element. The shield substantially prevents the lubrication fluid from traveling axially away from the bearing onto the rotor seal element.

The rotor seal element may include a seal surface that faces axially and/or radially away from the bearing.

The bearing may include an inner race and an outer race. The inner race may be mounted on the shaft and separated from the outer race by a gap. The shield may substantially block an axial line of sight between the gap and the rotor seal element.

The bearing may include an inner race and an outer race. The inner race may be mounted on the shaft and separated from the outer race by a gap. The shield may include a sleeve and an annular flange. The sleeve may be mounted on the shaft. The flange may substantially prevent the lubrication fluid from traveling axially from the bearing onto the rotor seal element.

The bearing may receive lubrication fluid. The flange may substantially prevent the lubrication fluid from traveling out of the bearing onto the rotor seal element.

The shield may be configured as an annular rotor shield that is mounted on the shaft axially between the inner race and the rotor seal element.

The inner race may extend radially outward to an outer surface with a first radius. The outer race may extend radially inward to an inner surface with a second radius. The shield may extend radially outward to an outer surface with a third radius that is greater than the first radius and/or less than the second radius.

The outer race may extend radially inward to an inner surface with a first radius. The shield may extend radially outward to an outer surface with a second radius that is substantially equal to or greater than the first radius.

The shield may include a sleeve and an annular flange. The sleeve may be mounted on the shaft. The flange may substantially block the axial line of sight between the gap and the rotor seal element.

The shield may axially engage (e.g., contact) the inner race or the rotor seal element.

The assembly may include a spacer that is mounted on the shaft axially between the shield and the inner race. In addition or alternatively, the assembly may include a spacer that is mounted on the shaft axially between the shield and the rotor seal element.

The inner race may extend radially outward to an outer surface with a first radius. The outer race may extend radially inward to an inner surface with a second radius. The shield may be configured as a stator shield that extends radially inward to an inner surface with a third radius that is greater than the first radius and/or less than the second radius.

The inner race may extend radially outward to an outer surface with a first radius. The shield may be configured as a stator shield that extends radially inward to an inner surface with a second radius that is substantially equal to or less than the first radius.

The assembly may include an annular stator seal element that axially engages and forms a seal with the rotor seal element. The rotor seal element may be arranged axially between the shield and the stator seal element.

The stator seal element may be configured as a lift-off face seal. The rotor seal element may be configured as a face seal landing.

The assembly may include a first rotor and a second rotor that are connected by the shaft. The first rotor may include a plurality of rotor blades that are connected to a rotor disk. The second rotor may include a plurality of rotor blades that are connected to a rotor disk The foregoing features and the operation of the invention will become more apparent in light of the following description and the accompanying drawings.

DETAILED DESCRIPTION OF THE INVENTION

Figure 1:
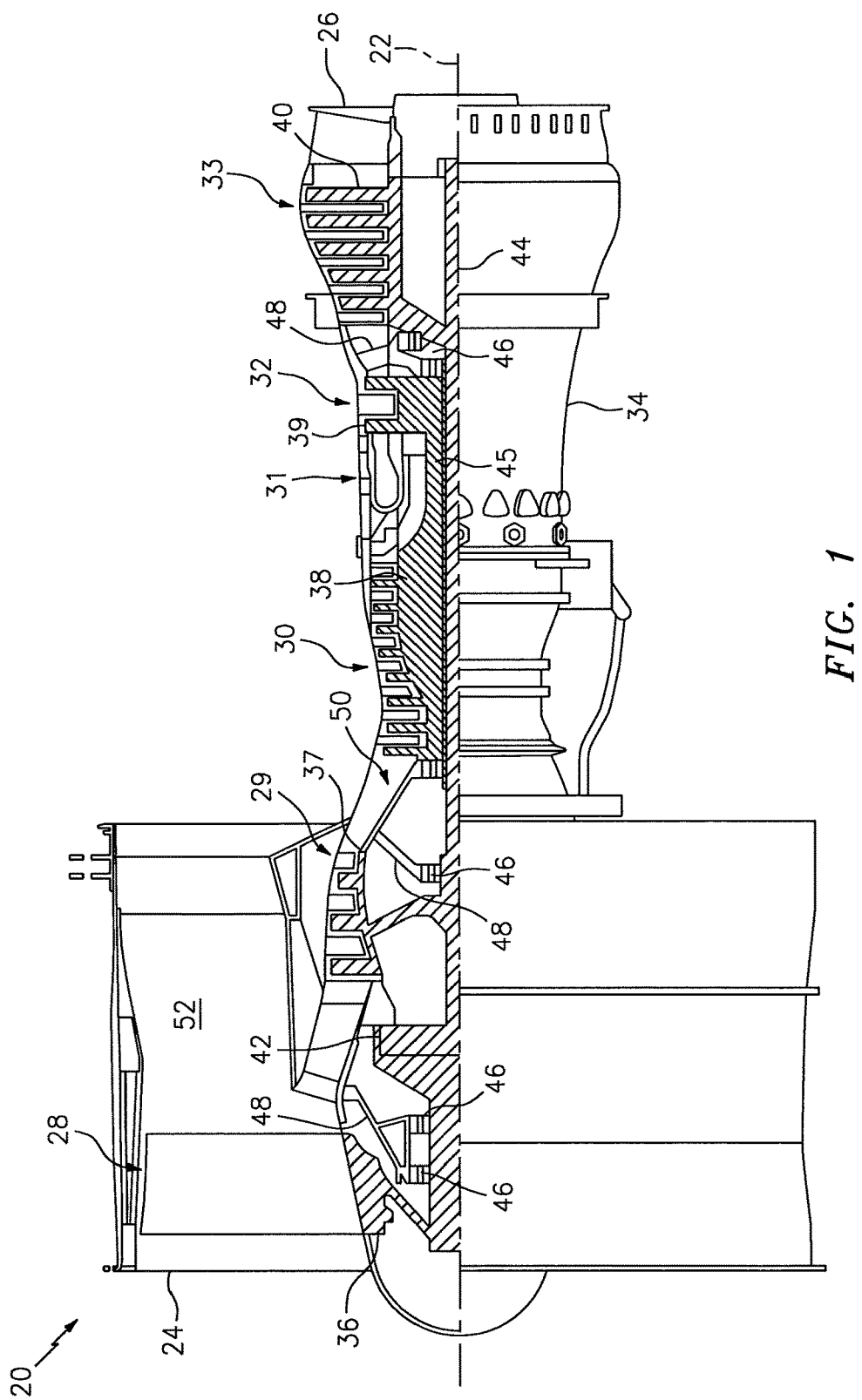
FIG. 1 is a side cutaway illustration of a geared turbine engine.

FIG. 1 is a sectional illustration of a geared turbine engine 20 that extends along an axis 22 between a forward airflow inlet 24 and an aft airflow exhaust 26. The engine 20 includes a fan section 28, a low pressure compressor (LPC) section 29, a high pressure compressor (HPC) section 30, a combustor section 31, a high pressure turbine (HPT) section 32, and a low pressure turbine (LPT) section 33. These engine sections 28-33 are arranged sequentially along the axis 22 and housed within an engine case 34.

Each of the engine sections 28-30, 32 and 33 includes a respective rotor 36-40. Each of the rotors 36-40 includes a plurality of rotor blades arranged circumferentially around and connected (e.g., mechanically fastened, welded, brazed, adhered or otherwise attached) to one or more respective rotor disks. The fan rotor 36 is connected to a gear train 42. The gear train 42 and the LPC rotor 37 are connected to and driven by the LPT rotor 40 through a low speed shaft 44. The HPC rotor 38 is connected to and driven by the HPT rotor 39 through a high speed shaft 45. The low and high speed shafts 44 and 45 are rotatably supported by a plurality of bearings 46. Each of the bearings 46 is connected to the engine case 34 by at least one stator 48 such as, for example, an annular support strut.

Air enters the engine 20 through the airflow inlet 24, and is directed through the fan section 28 and into an annular core gas path 50 and an annular bypass gas path 52. The air within the core gas path 50 may be referred to as "core air". The air within the bypass gas path 52 may be referred to as "bypass air" or "cooling air". The core air is directed through the engine sections 29-33 and exits the engine 20 through the airflow exhaust 26. Within the combustion section 31, fuel is injected into and mixed with the core air and ignited to provide forward engine thrust. The bypass air is directed through the bypass gas path 52 and out of the engine 20 to provide additional forward engine thrust or reverse thrust via a thrust reverser. The bypass air may also be utilized to cool various turbine engine components within one or more of the engine sections 29-33.

Figure 2:
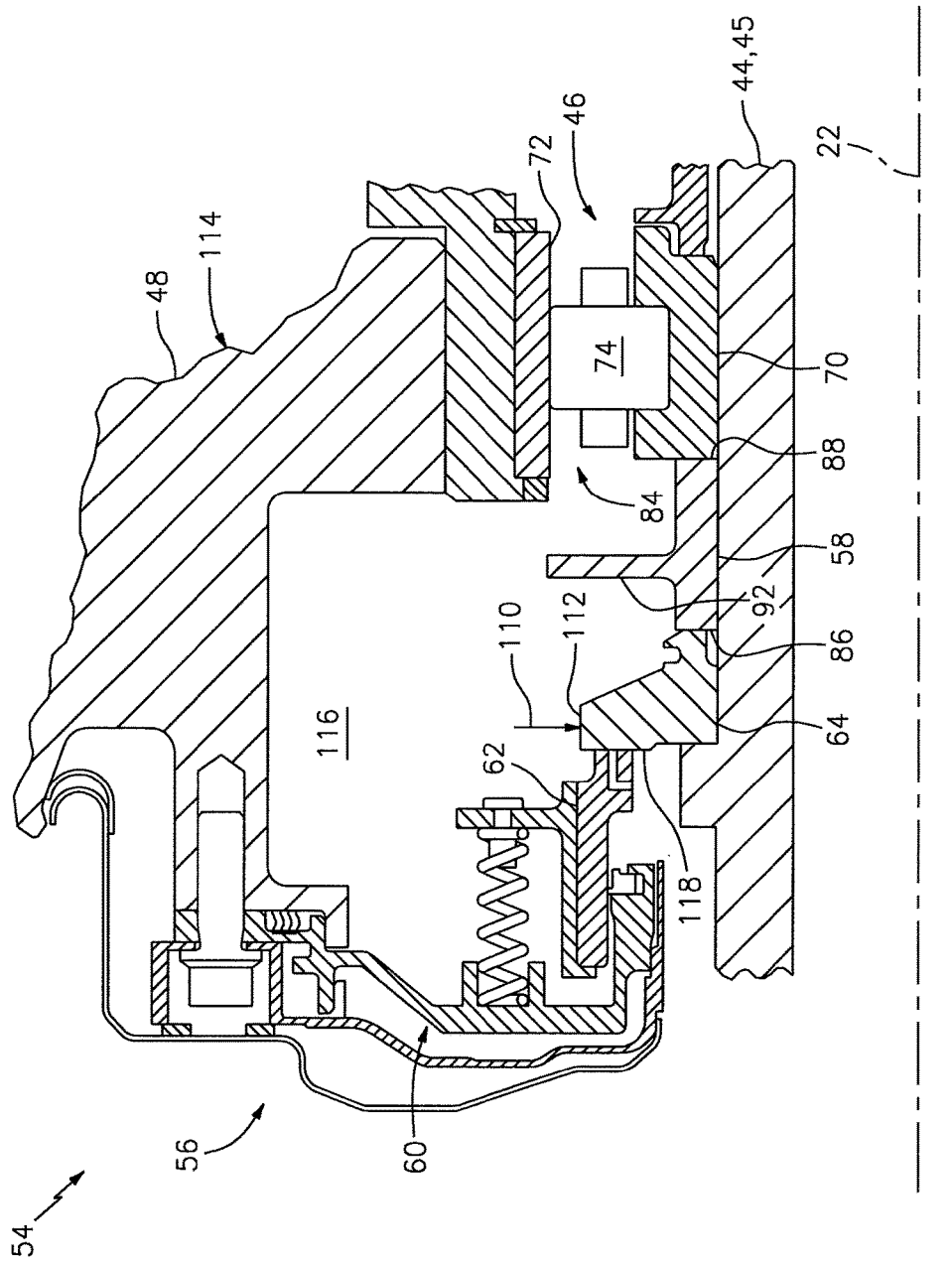
FIG. 2 is a partial side sectional illustration of a turbine engine assembly for the engine of FIG. 1 at a first circumferential location.
Figure 3:
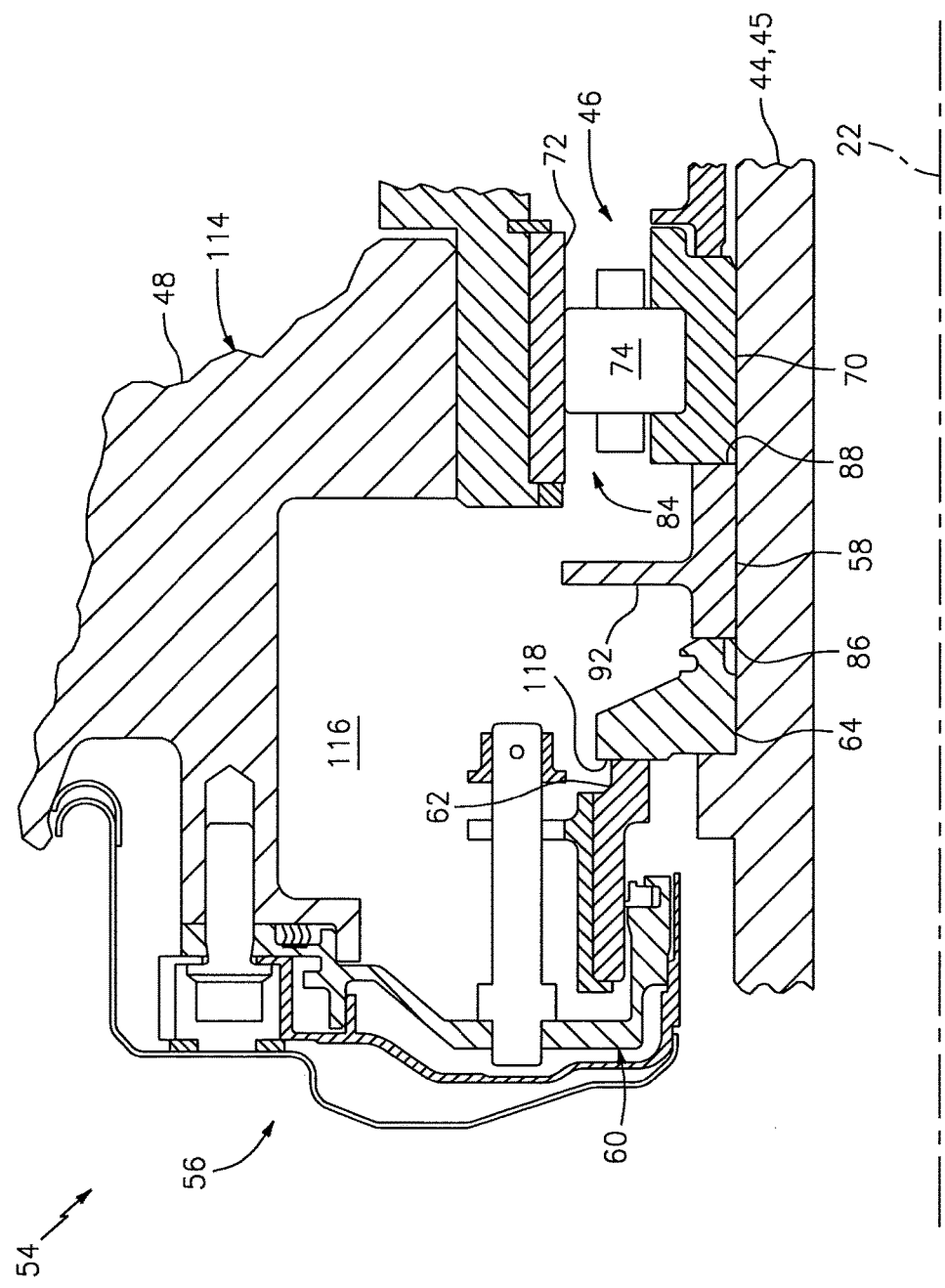
FIG. 3 is a partial side sectional illustration of the engine assembly of FIG. 2 at a second circumferential location.

FIGS. 2 and 3 illustrate a turbine engine assembly 54 included in the engine 20 of FIG. 1. The engine assembly 54 includes one of the shafts 44, 45, a seal assembly 56, one of the bearings 46, and an annular shield 58 (e.g., a rotor shield). The seal assembly 56 is adapted to seal a gap between one of the stators 48 and the respective shaft 44, 45. The seal assembly 56 includes an annular seal support 60, an annular stator seal element 62, and an annular rotor seal element 64. The stator seal element 62 may be configured as a hydrostatic seal such as a lift-off face seal. The rotor seal element 64 may be configured as a face seal landing.

Figure 4:
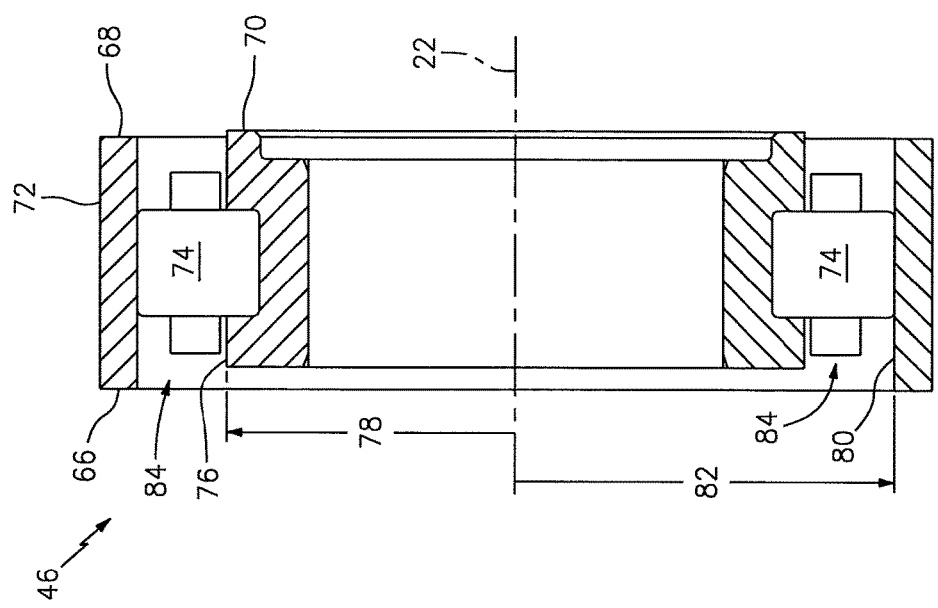
FIG. 4 is a side sectional illustration of a bearing for the engine assembly of FIGS. 2 and 3.

FIG. 4 illustrates the bearing 46 included in the engine assembly 54 of FIGS. 2 and 3. The bearing 46 extends axially between a bearing forward end 66 and a bearing aft end 68. The bearing 46 includes an annular inner race 70, an annular outer race 72, and a plurality of bearing elements 74 (e.g., cylinders, cones or balls). These bearing elements 74 are arranged circumferentially around the axis 22, and radially between the inner and the outer races 70 and 72.

The inner race 70 extends radially outward to a race outer surface 76 having a radius 78. The outer race 72 circumscribes the inner race 70, and extends radially inward to a race inner surface 80 having a radius 82 that is greater than the radius 78. In the bearing 46 of FIG. 4, the radiuses 78 and 82 are measured at (e.g., on, adjacent or proximate) the forward end 66 for ease of illustration. One or both of these radiuses 78 and 82, however, may alternatively be measured at another location along the outer and inner surfaces 76 and 80. The radius 78, for example, may be measured at a radial outer most location where the outer surface 76 has the largest radius. In another example, the radius 82 may be measured at a radial inner most location where the inner surface 80 has the smallest radius. An annular gap 84 extends radially between the inner and the outer surfaces 76 and 80 at the forward end 66.

Figure 5:
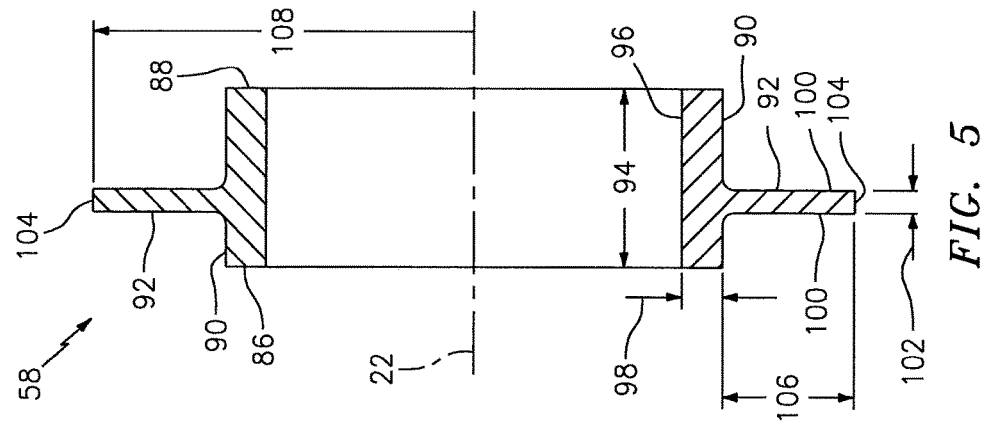
FIG. 5 is a side sectional illustration of a shield for the engine assembly of FIGS. 2 and 3.

FIG. 5 illustrates the shield 58 included in the engine assembly 54 of FIGS. 2 and 3. The shield 58 extends axially between a shield forward end 86 and a shield aft end 88. The shield 58 includes a tubular sleeve 90 and an annular disk 92 (e.g., an annular flange). The sleeve 90 extends axially between the forward and the aft ends 86 and 88, thereby defining an axial sleeve width 94. The sleeve 90 extends radially from a shield inner surface 96 to the disk 92, thereby defining a radial sleeve thickness 98 that may be less than the sleeve width 94. The disk 92 is axially offset from the forward end 86 and/or the aft end 88. The disk 92 extends axially between opposing surfaces 100, thereby defining an axial disk width 102 that is less than the sleeve width 94. The disk 92 extends radially out from the sleeve 90 to a shield outer surface 104, thereby defining a radial disk thickness 106. This disk thickness 106 may be greater than the disk width 102 and/or the sleeve thickness 98. The outer surface 104 has a radius 108 that is greater than the radius 78 (see FIG. 4). This radius 108, for example, may be substantially equal to the radius 82 as illustrated in FIGS. 2 and 3. Alternatively, the radius 108 may be less than or greater than the radius 82. In addition or alternatively, the radius 108 may be greater than a radius 110 of a radial outer surface 112 of the rotor seal element 64 as illustrated in FIG. 2.

Referring to FIGS. 2 and 3, the rotor seal element 64, the shield 58 and the inner race 70 are mounted on the shaft 44, 45. The shield forward end 86 axially engages (e.g., contacts) the rotor seal element 64. The shield aft end 88 axially engages the inner race 70. The disk 92 therefore substantially blocks a line of sight (e.g., an axial line of sight) into the gap 84 as well as a line of sight (e.g., an axial line of sight) between the gap 84 and the rotor seal element 64.

Figure 6:
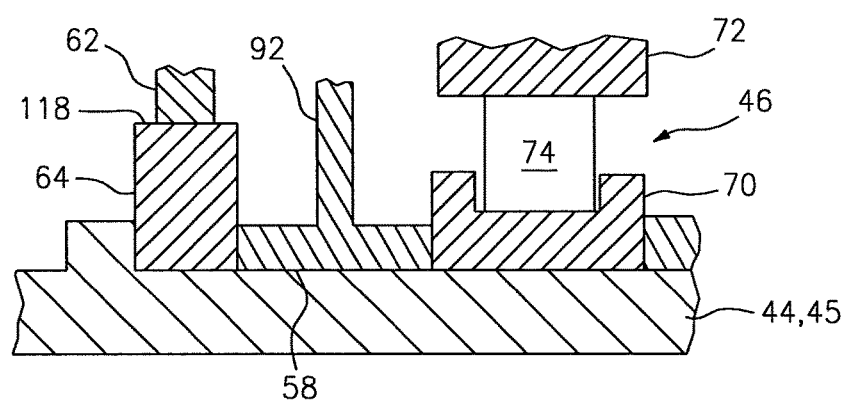
FIG. 6 is a partial side sectional illustration of a portion of an alternate embodiment turbine engine assembly for the engine of FIG. 1.

The outer race 72 is connected to the stator 48. The stator seal element 62 is connected to the seal support 60, and circumscribes the shaft 44, 45. The seal support 60 is connected to the stator 48. The seal support 60 and the stator 48 may form an annular housing 114. The housing 114 defines an annular chamber 116 into (e.g., through) which the shaft 44, 45 extends, and in which the seal elements 62 and 64, the shield 58 and the bearing 46 are arranged. The seal support 60 biases the stator seal element 62 towards a seal surface 118 of the rotor seal element 64 that faces axially away from the bearing 46. The stator seal element 62 therefore axially engages and form a seal with the rotor seal element 64. Alternatively, as illustrated in FIG. 6, the seal surface 118 may face radially away from the inner race 70 and/or the bearing 46. The stator seal element 62 therefore may radially engage and form a seal with the rotor seal element 64.

Figure 7:
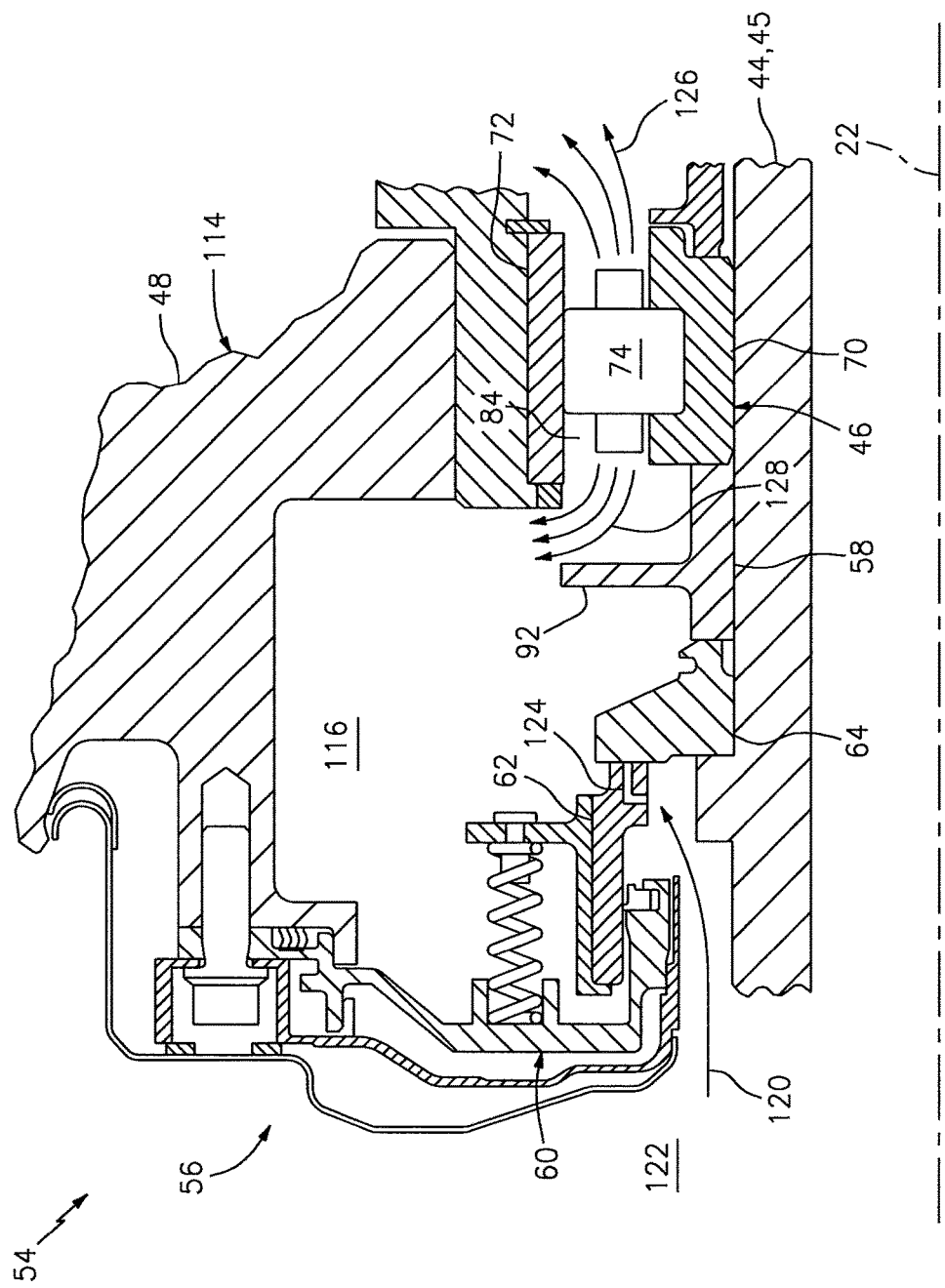
FIG. 7 is a partial side sectional illustration of the engine assembly of FIG. 2 during a mode of operation.

FIG. 7 illustrates the engine assembly 54 during a mode of engine operation where the seal elements 62 and 64 are exposed to relatively hot gas 120 within a plenum 122 located outside of the housing 114. A portion of this gas 120 may be directed into passages 124 within the stator seal element 62 to provide a film of air (e.g., a buffer) and reduce wear between the seal elements 62 and 64. Heat energy may be transferred from the gas 120 into the rotor seal element 64. Concurrently, the bearing 46 may receive relatively cool lubrication fluid (e.g., oil) to lubricate and/or cool the races 70 and 72 as well as the bearing elements 74. Various methods are known in the art for providing lubrication fluid to a bearing and therefore will not be discussed in further detail. A first portion 126 of the lubrication fluid may travel out of the bearing 46 in an axially aft and radially outward direction. A second portion 128 of the lubrication fluid may travel out of the gap 84 in an axially forward and radially outward direction. The disk 92 may substantially prevent some or all of the second portion 128 of the lubrication fluid from traveling towards (e.g., directly axially to) the rotor seal element 64. The disk 92 therefore may significantly reduce the quantity of lubrication fluid that would otherwise contact and transfer heat energy out of the rotor seal element 64. The rotor seal element 64 therefore may be subject to a relatively uniform temperature gradient, which may reduce coning of the rotor seal element 64.

Figure 8:
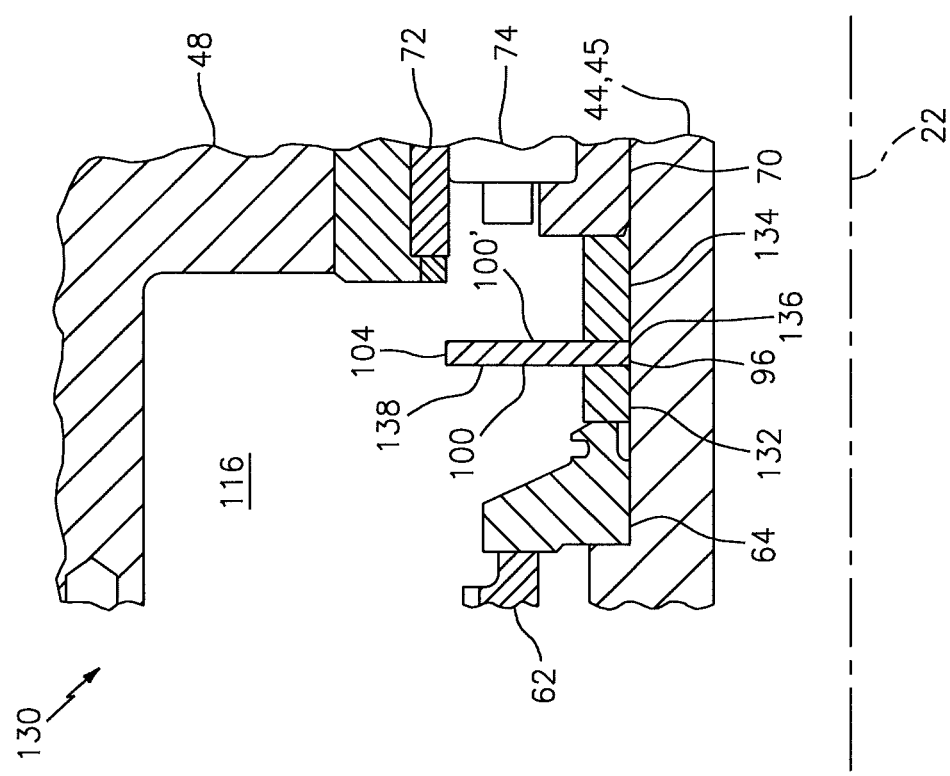
FIG. 8 is a partial side sectional illustration of a portion of an alternate embodiment turbine engine assembly for the engine of FIG. 1.

FIG. 8 illustrates an alternate embodiment turbine engine assembly 130 for the engine 20 of FIG. 1. In contrast to the engine assembly 54 of FIGS. 2 and 3, the engine assembly 130 includes one or more spacers 132 and 134 (e.g., tubular sleeves) and an alternate embodiment shield 136. The first spacer 132 is mounted on the shaft 44, 45 axially between the rotor seal element 64 and the shield 136. The second spacer 134 is mounted on the shaft 44, 45 axially between the shield 136 and the inner race 70. In contrast to the shield 58 of FIGS. 2 and 3, the shield 136 includes a disk 138 that extends radially between the shield inner surface 96 and the shield outer surface 104. The surface 100 engages the first spacer 132, and the second surface 100' engages the second spacer 134.

Figure 9:
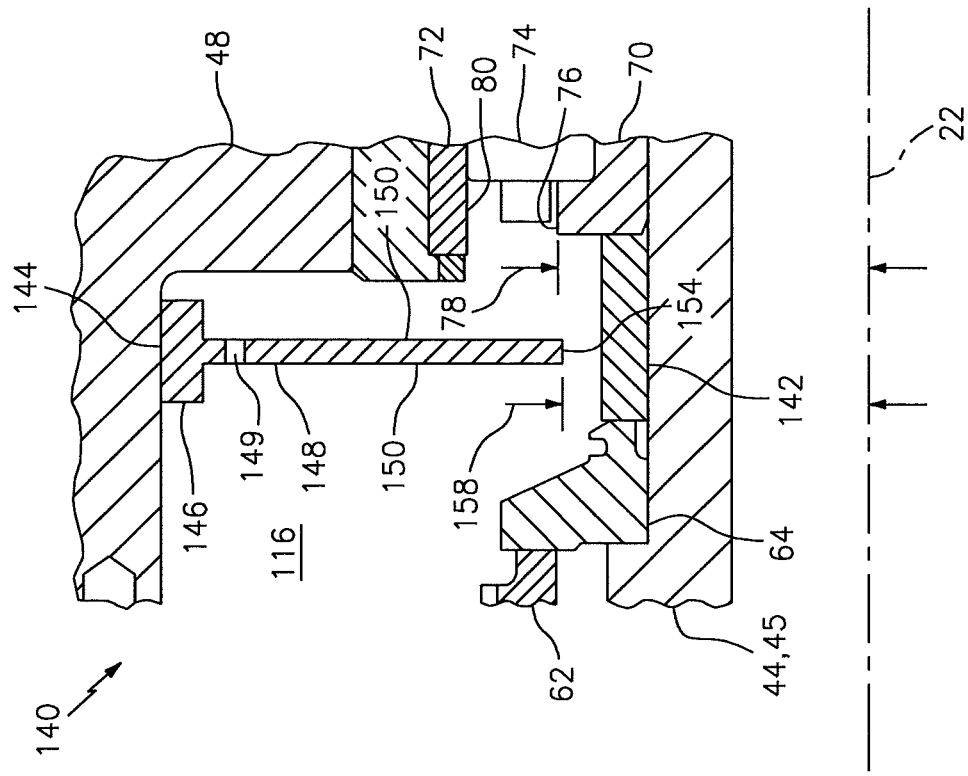
FIG. 9 is a partial side sectional illustration of a portion of another alternate embodiment turbine engine assembly for the engine of FIG. 1.

FIG. 9 illustrates another alternate embodiment turbine engine assembly 140 for the engine 20 of FIG. 1. In contrast to the engine assembly of FIGS. 2 and 3, the engine assembly 140 includes a spacer 142 (e.g., a tubular sleeve) and an alternate embodiment shield 144 (e.g., a stator shield). The spacer 142 is mounted on the shaft 44, 45, and axially engages the rotor seal element 64 and the inner race 70. In contrast to the shield 58 of FIGS. 2 and 3, the shield 144 includes a base 146 that circumscribes an annular disk 148 (e.g., an annular flange), which may include one or more apertures 149 (e.g., drainage apertures) that extend axially through the disk 148. The base 146 is connected to the stator 48. The disk 148 extends axially between opposing surfaces 150, thereby defining an axial disk width. The disk 148 extends radially inward from the base 146 to a shield inner surface 154, thereby defining a radial disk thickness that may be greater than the disk width. The inner surface 154 has a radius 158 that is less than the radius 82 (see FIG. 4) of the inner surface 80. This radius 158, for example, may be substantially equal to the radius 78 of the outer surface 76 as illustrated in FIG. 9. Alternatively, the radius 158 may be less than or greater than the radius 78.

The terms "forward", "aft", "inner" and "outer" are used to orientate the components of the engine assemblies 54, 130 and 140 described above relative to the turbine engine 20 and its axis 22. A person of skill in the art will recognize, however, one or more of these components such as the shields 58, 136 and 144 may be utilized in other orientations than those described above. The shield 58, 136 or 144, for example, may be arranged axially downstream of the inner race 70. The present invention therefore is not limited to any particular engine assembly or shield spatial orientations.

One or more of the foregoing engine assemblies and/or their components may have various configurations other than those illustrated in the drawings and described above. For example, a control gap may be defined between the stator seal element 62 and the rotor seal element 64. The stator seal element 62 may be configured as a ring seal element. One of the elements 62, 64 may include one or more knife edge seals that radially and/or axially engage an (e.g., abradable) portion of the other one of the elements 64, 62. The shield may also or alternatively be utilized to prevent lubrication fluid from directly contacting other components other than the rotor seal element. The shield may also or alternatively be configured, for example, to prevent lubrication oil from directly contacting temperature sensitive equipment such as telemetric electronics that may be housed within the chamber. The present invention therefore is not limited to any particular engine assembly or assembly component configurations.

A person of skill in the art will recognize the foregoing engine assemblies may be included in various turbine engines other than the one described above. A person of skill in the art will also recognize the engine assemblies may be included in various types of rotational equipment other than a turbine engine. The present invention therefore is not limited to any particular types or configurations of rotational equipment.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined within any one of the aspects and remain within the scope of the invention. Accordingly, the present invention is not to be restricted except in light of the attached claims and their equivalents.

What is claimed is:

1. A turbine engine assembly, comprising:
    a turbine engine shaft extending along an axis;
    a bearing including an inner race and an outer race, wherein the inner race is mounted on the shaft and is separated from the outer race by a gap;
    a rotor seal element mounted on the shaft;
    a shield blocking all axial lines of sight between the gap and the rotor seal element; and
    an annular stator seal element that axially engages and forms a seal with the rotor seal element, the rotor seal element arranged axially between the shield and the stator seal element.

2. The assembly of claim 1, wherein the rotor seal element includes a seal surface that faces away from the bearing.

3. The assembly of claim 1, wherein the shield comprises an annular rotor shield that is mounted on the shaft axially between the inner race and the rotor seal element.

4. The assembly of claim 3, wherein
    the inner race extends radially outward to an outer surface with a first radius;
    the outer race extends radially inward to an inner surface with a second radius; and
    the shield extends radially outward to an outer surface with a third radius that is greater than the first radius and less than the second radius.

5. The assembly of claim 3, wherein
    the outer race extends radially inward to an inner surface with a first radius; and
    the shield extends radially outward to an outer surface with a second radius that is one of equal to and greater than the first radius.

6. The assembly of claim 3, wherein the shield includes a sleeve and an annular flange, the sleeve is mounted on the shaft, and the flange blocks the axial line of sight between the gap and the rotor seal element.

7. The assembly of claim 3, wherein the shield axially engages at least one of the inner race and the rotor seal element.

8. The assembly of claim 3, further comprising a spacer mounted on the shaft axially between the shield and one of the inner race and the rotor seal element.

9. The assembly of claim 1, wherein
    the inner race extends radially outward to an outer surface with a first radius;
    the outer race extends radially inward to an inner surface with a second radius; and
    the shield comprises a stator shield that extends radially inward to an inner surface with a third radius that is greater than the first radius and less than the second radius.

10. The assembly of claim 1, wherein
    the inner race extends radially outward to an outer surface with a first radius; and
    the shield comprises a stator shield that extends radially inward to an inner surface with a second radius that is one of equal to and less than the first radius.

11. The assembly of claim 1, wherein the stator seal element comprises a lift-off face seal, and the rotor seal element comprises a face seal landing.

12. The assembly of claim 1, wherein
    the shield comprises an annular disk;
    the annular disk extends axially between opposing annular and planar side surfaces;
    the annular disk extends radially to a cylindrical end surface; and
    the cylindrical end surface respectively meets with the opposing annular and planar side surfaces at corners of the annular disk.

13. An assembly, comprising:
    a shaft extending along an axis;
    a bearing supporting the shaft, and receiving lubrication fluid;
    a stator seal element circumscribing the shaft;
    a rotor seal element mounted on the shaft axially between the bearing and the stator seal element, the rotor seal element axially engaging and forming a seal with the stator seal element; and
    a shield comprising an annular disk configured to prevent the lubrication fluid from traveling axially away from the bearing onto the rotor seal element;
    the annular disk extending axially between opposing disk side surfaces, and the annular disk extending radially to a disk end surface, wherein the disk end surface extends axially between and is contiguous with the opposing disk side surfaces.

14. The assembly of claim 13, wherein
    the bearing includes an inner race and an outer race, and the inner race is mounted on the shaft and is separated from the outer race by a gap; and
    the shield blocks an axial line of sight between the gap and the rotor seal element.

15. The assembly of claim 13, wherein
    the bearing includes an inner race and an outer race, and the inner race is mounted on the shaft and is separated from the outer race by a gap; and
    the shield further includes a sleeve mounted on the shaft, and the annular disk is connected to and projects radially from the sleeve.

16. The assembly of claim 13, wherein
    the bearing includes an inner race and an outer race;
    the inner race extends radially outward to an outer surface with a first radius;
    the outer race extends radially inward to an inner surface with a second radius; and
    the shield is mounted on the shaft axially between the inner race and the rotor seal element, and the annular disk extends radially outward to the disk end surface with a third radius that is greater than the first radius and less than the second radius.

17. The assembly of claim 13, wherein
    the bearing includes an outer race that extends radially inward to an inner surface with a first radius; and the shield is mounted on the shaft axially between the inner race and the rotor seal element, and the annular disk extends radially outward to the disk end surface with a second radius that is one of equal to and greater than the first radius.

18. A turbine engine assembly, comprising:

a housing defining an annular chamber;

a turbine engine shaft extending along an axis into the chamber;

a bearing supporting the shaft within the chamber, and including an inner race and an outer race that is separated from the inner race by a gap;

a rotor seal element mounted on the shaft within the chamber, the rotor seal element including a seal surface that faces away from the bearing; and a shield including a sleeve and a flange, wherein the sleeve is mounted on the shaft axially between the bearing and the rotor seal element, and the flange extends radially from the sleeve to a distal end surface and blocks a line of sight into the gap;

wherein a first axial thickness of the flange at an interface between flange and the shield is equal to a second axial thickness of the flange at the distal end surface.

19. The assembly of claim 18, wherein the bearing receives lubrication fluid; and the flange prevents the lubrication fluid from traveling out of the bearing onto the rotor seal element.

20. The assembly of claim 18, wherein the inner race extends radially outward to an outer surface with a first radius; and the flange extends radially outward to an outer surface with a second radius that is greater than the first radius.

* * * * *